(No Model.)  S. M. BALZER.  3 Sheets—Sheet 1.
MOTOR OR ENGINE.
No. 573,174.  Patented Dec. 15, 1896.
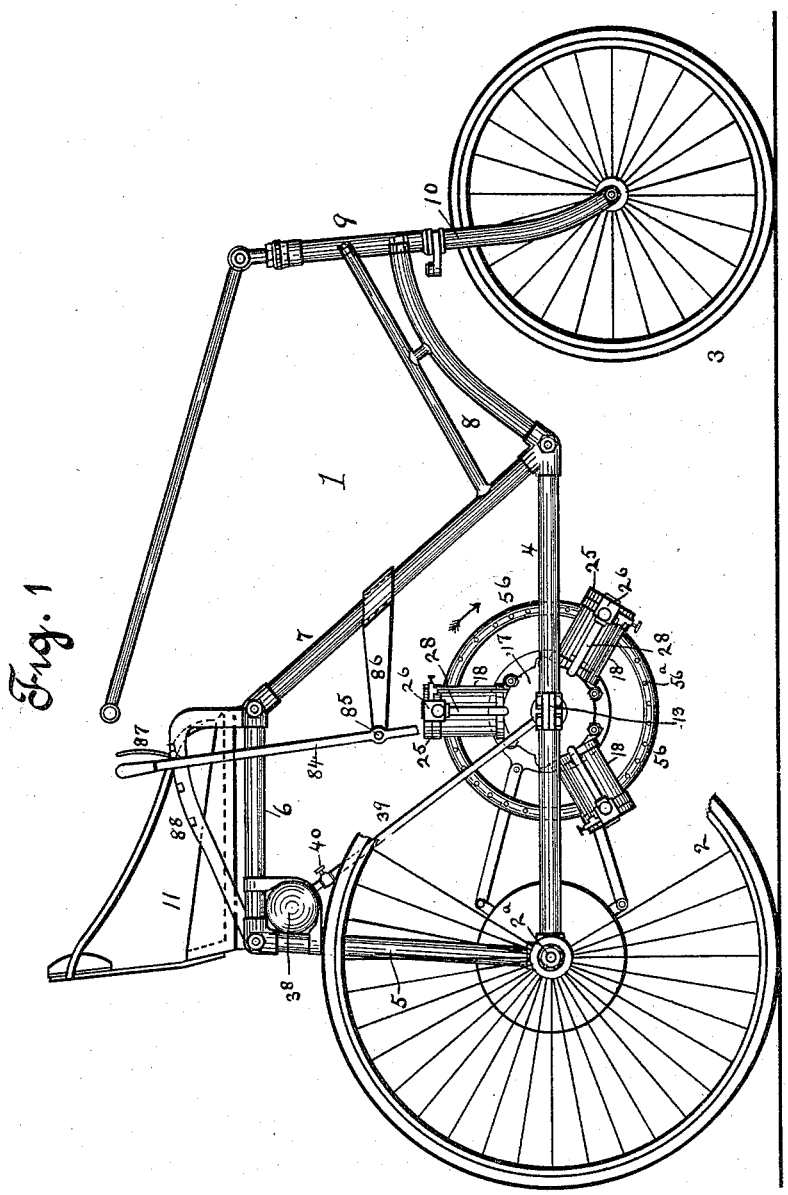

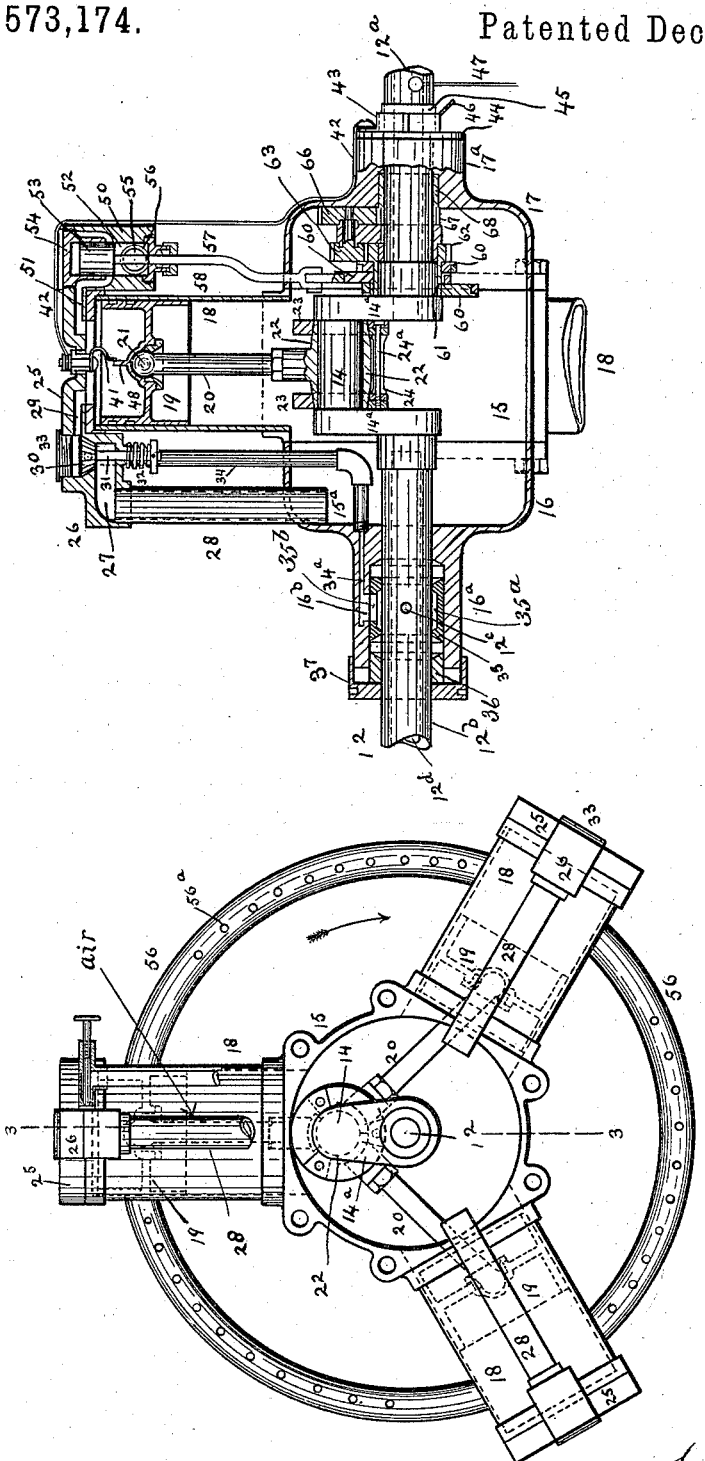

(No Model.) 3 Sheets—Sheet 3.

S. M. BALZER.
MOTOR OR ENGINE.

No. 573,174. Patented Dec. 15, 1896.

Witnesses
E. D. Tepper
Otto Zimmerman

S. M. Balzer
Inventor

By his Attorney
J. F. Bourne

UNITED STATES PATENT OFFICE.

STEPHEN M. BALZER, OF NEW YORK, N. Y., ASSIGNOR OF ONE-HALF TO WILLIAM H. HUMPHREY, OF NORFOLK, CONNECTICUT.

MOTOR OR ENGINE.

SPECIFICATION forming part of Letters Patent No. 573,174, dated December 15, 1896.

Application filed January 23, 1896. Serial No. 576,498. (No model.)

*To all whom it may concern:*

Be it known that I, STEPHEN M. BALZER, a citizen of the United States, residing in New York city, county and State of New York, have invented certain new and useful Improvements in Motors or Engines, of which the following is a specification.

The invention consists in a motor or engine having a casing adapted to rotate around a crank shaft or axle, and provided with a plurality of cylinders and pistons and novel means for taking in, utilizing, and exhausting the actuating medium.

The invention also consists in the novel details of improvement and the combination of parts that will be more fully hereinafter set forth and then pointed out in the claims.

Reference is to be had to the accompanying drawings, forming part hereof, wherein—

Figure 4:
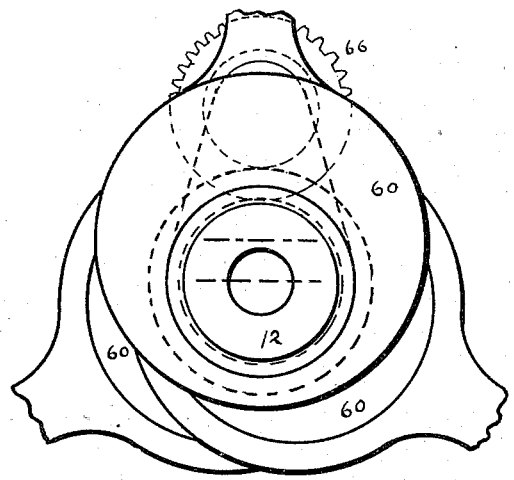
Figure 5:
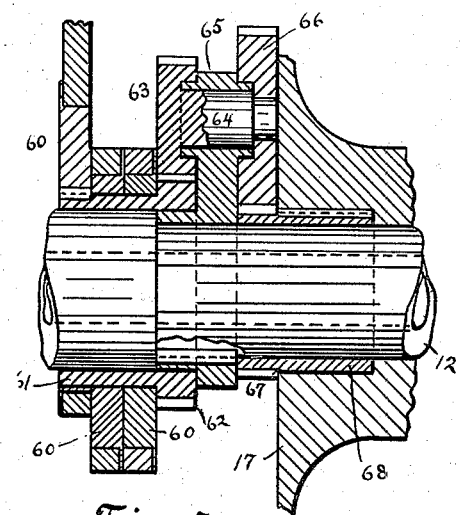
Figure 6:
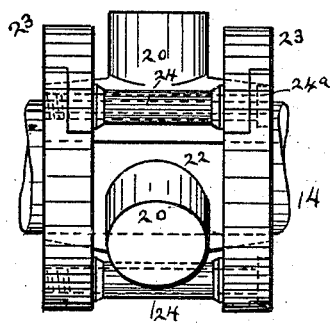
Figure 7:
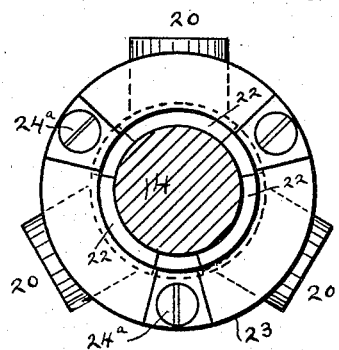
Figure 10:
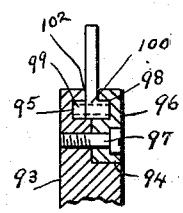
Figure 8:
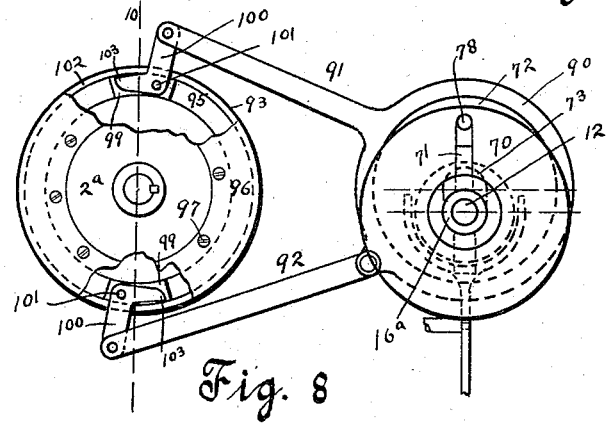
Figure 9:
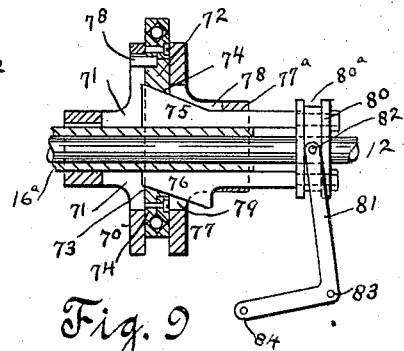

Figure 1 is a side elevation, partly broken, of a vehicle provided with my improvements. Fig. 2 is a side elevation of the motor or engine, part being removed and part broken away to show the relative positions of inclosed parts. Fig. 3 is a vertical section on the plane of the line 3 3 in Fig. 2. Fig. 4 is a detail side view of the eccentrics for operating the outlet-valves of the cylinders. Fig. 5 is a sectional view through said eccentrics and connected parts. Fig. 6 is a detail edge view showing the connection of the piston-rods with the crank. Fig. 7 is a side view thereof. Fig. 8 is a partly-broken side view showing means for transmitting motion from the motor or engine to a driving shaft or wheel. Fig. 9 is a sectional detail view showing means for regulating the eccentricity of the power-transmitting eccentrics, and Fig. 10 is a detail section on the plane of the line 10 in Fig. 8.

I have illustrated my improvements as applied to a vehicle, but it will be understood that the invention is not limited to such use, as it may be applied to many other uses.

In the accompanying drawings, in which similar numerals of reference indicate corresponding parts in the several views, the number 1 indicates generally a suitable vehicle which is provided with a driving wheel or wheels 2 and steering wheel or wheels 3. The frame of the vehicle may of course be of suitable or desired construction. I have shown it generally in the style of a cycle-frame, composed of horizontal tubes 4, vertical tubes 5, top horizontal tubes 6, inclined tubes 7, connecting the tubes 4 and 6, and a forwardly-extending brace 8, connecting the main frame with the head 9, which carries the forks 10 in the usual form of bicycle construction. The tubes of the vehicle are connected together by couplings in well-known manner.

11 is a suitable seat carried by the main frame. It will be understood, however, that a vehicle to which my improvements may be applied can be constructed in any other suitable manner.

12 is a shaft shown supported by the vehicle-frame and held stationary by suitable clamps or supports 13, which are shown carried by the tubes 4, whereby the shaft 12 is suspended across the frame of the vehicle.

My improved motor or engine is of the type which rotates around a stationary shaft and has a suitable casing which carries the cylinders and other operating parts. The shaft 12, which is the main shaft of the motor, has a crank-pin 14, (shown carried by arms 14ª in well-known manner,) but of course the crank-shaft 12 may be made in any desired manner and carried in any suitable supports. The casing shown consists of a central shell 15, which surrounds the crank 14, and on the sides of this shell are bolted or otherwise fastened shells 16 17, which have tubular extensions or bearings 16ª 17ª, which receive and rotate upon the shaft 12. Of course the central shell and one of the side shells could be made in a single structure and the extensions or bearings 16ª 17ª can be fitted with ball-bearings to reduce friction on the shaft 12. This casing or shell (its central part 15) carries suitably-arranged cylinders 18, which are secured thereto by screw-threads or otherwise and open into the interior of the casing, (see Fig. 3,) these cylinders being closed at their outer ends and alined with the crank-pin 14. 19 is the piston within the cylinder, and 20 the piston-rod, which may be connected therewith by a ball-and-socket joint 21, or otherwise, to allow independent movement between the piston and its rod. (See Fig. 3.)

As there are a plurality of piston-rods 20, all working on the same crank-pin 14, I provide each rod with a foot or extension 22, the under surface of which is curved to correspond with the periphery of the pin 14. (See Fig. 7.) The width of the feet 22 of the rods 20 is such as to leave a space between them, so that said rods can have necessary oscillatory movements on the pin 14. (See Fig. 7.) The feet 22 of the piston-rods 20 are held upon the pin 14, so that the rods 20 can effect a pulling action on the pin 14 by rings 23, which surround the feet 22, as shown in Figs. 3, 6, and 7. The feet 22 are held from movement along the pin 14 by the crank-arms 14$^a$. (See Fig. 3.) To adjust the rings 23 in position around the pin 14 and feet 22, said rings are made in sections, (see Figs. 6 and 7,) and these rings are held together and spaced apart by studs, screws, or bolts 24. To form a firm structure, the sections of the rings 23 overlap or are dovetailed together and the bolts or screws pass through these joints. (See Figs. 6 and 7.) By preference the studs 24 are hollow, and screws or screw-bolts 24$^a$ pass through them and through the sections of the rings 23, as shown in Fig. 3.

In order to take up wear that may occur between the outer surfaces of the feet 22 and the inner surfaces of the rings 23, the outer surfaces of the feet 22 are inclined outwardly, as in Fig. 3, so that as wear occurs the rings 23 may be adjusted nearer the rods 20.

While the above-described devices afford a convenient and simple means for connecting the piston-rods 20 with the crank-pin 14, so that independent movement may take place between the parts, it is evident that other means may be employed for connecting the piston-rods with the crank 14.

My improved motor is designed to be operated by hydrocarbon oil or gas and air, but could be used by any other suitable propulsive medium. To properly use this oil or gas and air, I have provided means for supplying the cylinders with the oil and air, for compressing and exploding the same, and for properly exhausting the expended charge. For this purpose I have shown the following arrangements, to wit: The outer end of each cylinder 18 is provided with a plate or cover 25, suitably connected therewith, and on one side of each plate is an enlargement, casting, or housing 26, having a chamber or channel 27, into which projects an air-pipe 28. These pipes at the opposite ends pass into the chamber 15$^a$ of the shell or casing 15 16 17, and serve to draw air therefrom to supply the cylinders 18 through the chambers or channels 27. The portion 12$^a$ of the shaft 12 is hollow throughout to admit air to the chamber 15$^a$, and as air thus enters the casing 15 16 17 it serves to cool the latter and the contained mechanism; but it is evident that air could be admitted to chamber 15$^a$ otherwise, say, for instance, by apertures in the side of the casing, but by the means shown the danger of dust, &c., entering the casing is reduced. It is also obvious that the pipes 28 could take in air without receiving it from the chamber 15$^a$.

The chamber or channel 27 communicates with the cylinder 18 by a channel 29 in the plate or cover 25, and a valve 30 regulates communication between said chambers. The valve-stem 31 is shown passing through the plate or cover 25, and provided with a spring 32, suitably arranged, which normally holds the valve 30 to its seat. The valve 30 is operated by suction, as hereinafter explained, to admit air and oil to the cylinder 18.

33 is a plug which closes the opening that admits the valve 30 to its seat.

The valves 30 regulate the admission of oil to the cylinders 18, as well as air, and for this purpose an oil-pipe 34 leads to the valve-seat and is fastened in the plate or cover 25, (see Fig. 3,) its delivery end being in line with the valve 30, as shown in dotted lines in Fig. 3.

As the casing 15 16 17 rotates I have provided means for supplying oil to the pipe 34 through the portion 12$^b$ of the shaft 12, which for this purpose is hollow, its inner end being plugged, or, in other words, the portion 12$^b$ of the shaft has a bore to receive oil. For convenience of manufacture a hollow shaft or tube may be used, the inner end of the portion 12$^b$ being plugged.

12$^c$ is a hole in the shaft leading to its bore 12$^d$, and the bearing 16$^a$ of the casing 15 16 17 is provided with a chamber 16$^b$ into which the hole 12$^c$ opens. The chamber 16$^b$ communicates with a channel 34$^a$ in the bearing 16$^a$, which channel connects with the pipe 34. The pipe 34 for this purpose passes into the casing 16, as in Fig. 3. 35 and 36 are suitable bushings in the bearing or extension 16$^a$, through which the shaft 12 passes, the bushing 35 having an annular cavity 35$^a$ and an aperture 35$^b$, leading from the cavity 35$^a$ to the chamber 16$^b$. The bushings hold packing in place to keep the oil properly in position, a cap 37 on the bearing 16$^a$ serving to keep said bushings 6 and packing in place. Oil may be supplied to the bore 12$^d$ of the shaft 12 in any suitable manner. I have shown a reservoir 38, carried by frame 1 and leading by a pipe 39 to the outer end of the portion 12$^b$ of shaft 12, a cock 40 serving to regulate the supply of oil to the motor.

It will be understood that after the proper proportions of air and oil have been admitted to the cylinder 18 it is to be compressed and then exploded, and that any suitable means may be provided for exploding the mixture. For convenience I utilize an electric battery and circuit to produce a spark in the cylinder 18, and for this purpose I have shown the following arrangement: Carried by the plate 25 and within the cylinder 18 is a contact 41, which is connected to a wire 42, which leads to a metal ring 43, that is carried by the bearing 17$^a$, and insulated therefrom and from the shaft 12, as by insulation 44 45 46, is a contact or brush in engagement with the ring or commutator 43, and it leads to one pole of a battery, (not shown,) the other pole of the battery being connected by a wire 47 with the shaft 12. The circuit leads thence, through the metal of the motor mechanism, to a contact 48, carried by the piston 19 and adapted to engage the contact 41 when the piston is at the outer part of its stroke, so that when contact is broken a spark will be produced to explode the oil and air mixture.

The oil and air are to be retained in the cylinder 18 during compression and while propelling the piston, and must then be exhausted therefrom. For this purpose the plate or cover 25 is provided with an enlargement or casting 50 on the side opposite the enlargement 26. (See Fig. 3.) A port or channel 51 leads from the outer end of cylinder 18 to a valve-chamber 52 in the part 50, in which chamber a valve 53 works to open and close said port 51.

54 is a plug closing the chamber 52, and this plug is shown provided with a recess or counterbore in which the valve 53 works. 55 is the exhaust-outlet for the chamber 52. To prevent a noise being made as the exhausted gases pass from the cylinder 18, I connect a pipe 56 to the exhaust-openings 55, which pipe is provided with a series of holes 56$^a$, which serve to permit the escape of the gases while preventing them from making a noise. As there are a plurality of cylinders 18 I preferably connect the ends of the pipes 56 with the two adjacent cylinders, but each pipe only opens into one chamber 50. These pipes are curved, and also serve as well as a balance-wheel for the motor. The valve stem or rod 57 projects through a suitable stuffing-box 58 and connects with an eccentric supported by the shaft 12, one for each cylinder.

In the operation of this motor each cylinder makes two revolutions for each charge of propulsive material, and during the greater part of these two revolutions around shaft 12 the valve 52 keeps the port 51 closed and only opens at one instant to allow the escape of the exhausted charge, or, in other words, when the piston 19 first moves toward the crank it draws in a charge of air and oil. (This takes place during the first half-revolution of the motor.) The piston next recedes, (during the other half-revolution,) and thus compresses the charge of air and gas. During the next half-revolution of the motor the charge is exploded and expanded to give motion to the parts. While the motor is thus making one and a half rotations the valve 52 remains closed; but as soon as the piston starts to move back to the outer end of the cylinder during the fourth half-revolution of the motor the valve 52 operates quickly to open the exhaust-port and permit the expanded charge to escape. To cause these valves to thus operate at the proper time, I make the eccentrics 60 independently rotative and cause them to rotate just one-half as fast as the cylinders, or, in other words, the cylinders make two rotations or revolutions around shaft 12 to one of the eccentrics 60. As there are three cylinders 18 I have shown three eccentrics 60, one for each cylinder, and these eccentrics are connected together and rotated as follows: 61 is a sleeve mounted to rotate on the shaft 12, which sleeve passes through the eccentrics and is keyed or otherwise secured to them. The eccentrics 60 are located in proper position relatively to each other to cause the valves 53 to operate at the proper time. The sleeve 61 carries a pinion or spur-teeth 62, with which a pinion 63 meshes. The spindle 64 of the pinion 63 is journaled in bearings on an arm 65, that is secured to and projects from the shaft 12, said spindle also carrying a pinion 66, which meshes with spur-teeth or a gear 67, carried by the casing 17. The teeth 67 are shown carried by a tube 68, which is socketed in and secured to the part 17 of the casing or shell. By these means as the casing rotates the eccentrics 60 will be rotated together through the gearing above mentioned, and the relation of the gearing is such that the eccentrics will be given but one complete revolution to two revolutions of the casing. The eccentrics 60 have straps which are connected with the stems or rods 57 to actuate the valves 52.

The relation of the parts is such that a cylinder 18 can make three half-turns around shaft 12 before one eccentric 60 will act to operate the valves 52, because as the eccentrics rotate but half as fast as the cylinders they will be kept from operating the corresponding valve 52 until such time as the exploded charge is to be exhausted.

The operation of the motor or engine above described is as follows: Suppose the motor is at rest with one cylnder 18 in the position shown in Fig. 3, the valves 30 and 52 being closed and the piston 19 at the outer end of the cylinder 18. (The position of all the pistons at this time will be seen in Fig. 2.) The motor now starts to rotate in the direction of the arrow in Fig. 2, and thereby the piston 19, Fig. 3, now travels toward the inner end of the cylinder, (for the present only one cylinder will be referred to,) whereupon it acts to suck or create a partial vacuum at the outer end of the cylinder. When this suction or vacuum is strong enough it will lift the valve 30 from its seat, whereupon air from the pipe 28 will rush into the cylinder, as will also a proper amount of oil from the pipe 34. When the proper charge of air and oil has entered the cylinder, the valve 30 will close. After the casing has made a half-turn the piston 19 passes toward the outer end of the cylinder 18, thus compressing the charge of air and oil, and when the piston reaches its outer limits the contacts 41 48 will engage. As the casing starts to make the next revolution the contacts 41 48 separate and produce an electric spark, which causes the compressed charge to explode, thereby creating a propulsive force in the cylinder during the third half-turn. During this complete rotation of the casing, and until the cylinder has made the third half-turn around shaft 12, the valve 53 remains closed because its eccentric has rotated less than the cylinder and kept its narrow part toward the valve. During the next or fourth half-turn of the casing the corresponding eccentric 60 will turn, so as to present its greatest eccentric part toward the valve 53, whereupon the latter will move to open the ports 51 55 to permit exhaustion of the cylinder. When the piston 19 reaches the outer part of the cylinder 18, the valve 53 will close. The length of the valve 53 and the shape and movement of the eccentric 60 are such that only during the fourth half of two revolutions will the valve 53 open. It will be understood from what has been stated that when three cylinders are used, placed one hundred and twenty degrees apart, as in Fig. 2, the piston of one will be pushing, another will be drawing in a charge, and the next will be compressing a charge; but these relations of action may change, as there are three cylinders, each of which requires two rotations around shaft 12 to complete a cycle of four operations, that is to say, taking in a charge, compressing it, exploding and expanding it, and then exhausting it.

As the crank remains stationary and the casing can rotate it is evident that the piston-rods must have independent movement on the crank-pin, and this is permitted by the spaces between the feet 22 and by the ball-and-socket joint 21.

Motion may be transmitted from the rotative casing of the motor to the axle or shaft $2^a$, or to any other part to be rotated. In Figs. 8, 9, and 10 I have shown devices for this purpose. Upon the bearing or extension 16 of the main casing is splined or otherwise secured a disk or arm 70, provided with a slot 71.

72 is an eccentric placed against the disk 70 and mounted on the bearing $16^a$, this eccentric having a slot 73, through which the bearing or extension $16^a$ passes. The upper and lower edges of this slot are beveled at 74 and engage inclined or wedge-shaped slides 75 76, which lie on the bearing or extension $16^a$. (See Fig. 9.)

77 is a disk or plate secured to the bearing or extension $16^a$ and placed against the eccentric 72, whereby the latter is held properly in position, so that it can slide laterally of the bearing or extension $16^a$. The eccentric 72 carries a pin or projection 78, which enters the slot 71 in disk 70, whereby the latter carries the eccentric around with it and yet the eccentric can move parallel to the disk 70. The slides 75 76 travel in suitable slots 78 79 in the disk or plate 77 and its hub $77^a$. By moving the slides 75 76 out or in the eccentric 72 can be moved into a more or less eccentric position relatively to the bearing $16^a$ or shaft 12, and can also be so moved that it will be concentric to the bearing or shaft, so that it will merely rotate without transmitting power. These inclines 75 76 act to hold the eccentric 72 in whichever position it is placed. The slides 75 76 may be operated by any suitable means. I have shown them connected by a grooved ring 80, which is engaged by a forked lever 81 or by pins 82, carried thereby, which enter the groove $80^a$ in said ring. The lever 81 is shown as a bell-crank lever pivoted at 83 and pivotally connected with a hand-operated lever 84, pivoted, as at 85, to a support 86, carried by the inclined tube 7. The upper end of the lever 84 extends near the seat 11 and has a dog 87 to engage a rack 88, carried by frame 1 or seat 11 to hold the lever 84 in the desired position.

The eccentric 72 receives a strap or straps 90, from which extend rods 91 92, that operate a clutching device connected with the shaft $2^a$ or the wheel 2. The clutching device I have shown is as follows:

93 is a disk keyed or fastened on the shaft $2^a$ and having an annular recess 94 on one side near its periphery and a supplemental groove 95. (See Figs. 8 and 10.)

96 is a ring or plate fastened on the side of the disk 93 and located in or over the recess 94 and secured by screws or bolts 97, the ring 96 having an annular groove 98, which registers with the groove 95 in the disk 93.

99 is a block in the groove 95, and 100 is a bell-crank or angle lever or dog fitting in the groove 98 and partly in the groove 95, (see Fig. 10,) the parts 99 and 100 being pivoted together, as by a pivot 101. A circumferential groove 102 is provided in the disk 93 and ring 96 to receive the outwardly-projecting arm of lever 100, so that said lever can rock. The toe 103 of lever 100 is adapted to impinge on the metal of the disk 93 and ring 96, at which time the block 99 is jammed against disk 93 to clutch the parts together. The levers 100 are pivotally connected with the rods 91 92. While one rod 91 and one block 99 and lever 100 could be used, I prefer to use two or more sets of such devices to cause more continuous gripping of the disk 93. The rod 91 is shown pivotally connected with the strap 90 to permit independent movement between the parts.

With the arrangement above described as the eccentric 72 rotates it draws on the rod 91, and thus tilts the lever 100, causing its toe 103 to bind on the rim of the disk 93 and ring 96 and the block 99 to impinge on the disk 93, whereby the disk will be clutched and pulled as the rod 91 advances. The reverse motion takes place with rod 92 and its connected lever 100, thus freeing the disk 93 from said lever, and when the eccentric 72 turns around the rod 91 and its connected clutching parts will release the disk 93, and the lever 92 and connected parts will clutch and draw on the disk 93, an alternate drawing action thus taking place. When speed is desired, the eccentric 72 will be moved outwardly, but when power is required the eccentric 72 will be moved inwardly. When it is desired to allow the vehicle to run without propulsion, (by momentum,) the eccentric 72 will be moved inwardly to a concentric position, so that the rods 91 and 92 will not be operated to draw on the disk 93.

It is evident that a ratchet-and-pawl device or other suitable clutch could be used instead of the block 99 and lever 100, if desired, but the latter is noiseless and has little frictional resistance.

The entire mechanism is simple in construction and not liable to get out of order. As the operating parts of the motor are inclosed in the rotative casing 15 16 17, they are kept from the dust of the road and will need very little attention.

Having now described my invention, what I claim is—

1. In a gas or oil engine, the combination of a crank-shaft having a bore, a casing rotative thereon, a plurality of cylinders carried by said casing, each cylinder having a port or channel leading to it, an air and an oil supply pipe leading to each of said ports or channels, pistons connected with the crank, means for supplying oil to one of said pipes for each cylinder from the bore in said shaft, and for also supplying air to the corresponding air-pipe, valves for simultaneously controlling the passage of air and oil from the corresponding port or channel to the cylinder and arranged to be opened by suction within the cylinders, and means for exhausting the spent charge from said cylinders, substantially as described.

2. The combination of a crank-shaft, with a casing rotative thereon, said shaft having a bore at one portion leading to said casing and a bore in its other portion that is closed at the inner end, a cylinder carried by said casing, a piston connected with the crank, an air-supply pipe for the cylinder leading into said casing, an oil-supply pipe leading to a chamber or channel in the casing, said shaft having an aperture leading from its bore to said chamber or channel, a chamber or channel to which said oil-pipe leads, and connected with the cylinder, a valve for controlling the passage of air and oil to the cylinder and means for exhausting an exploded charge from said cylinder, substantially as described.

3. The combination of a crank-shaft having a bore, closed at its inner end with a casing rotative on said shaft, a cylinder and piston, air and oil pipes communicating with said cylinder, a valve for controlling the passage of air and oil to said cylinder, a bearing or extension carried by said casing, a chamber therein communicating with said oil-pipe, a bushing therein surrounding said shaft, said shaft having an aperture connecting its bore with said chamber, and means for exhausting an exploded charge from said cylinder, substantially as described.

4. The combination of a crank-shaft having a bore, a casing rotative thereon, a cylinder carried by said casing, a piston, a plate on said cylinder having an inlet channel or port leading thereto, oil and air supply pipes leading to said channel or port, the oil-supply pipe connecting the bore of said shaft with said channel or port, a valve for controlling said channel or port, an exhaust port or channel in said plate, a valve therein, means for operating said valve, and a perforated tube connected with said exhaust channel or port, substantially as described.

5. The combination of a crank-shaft having a bore, with a rotative casing, a cylinder, a pipe forming communication between the cylinder and the casing, a piston, means for supplying said cylinder with oil from the bore in the shaft, an exhaust port and valve, and a perforated tube connected therewith, substantially as described.

6. The combination of a crank-shaft, a casing rotative thereon, a plurality of cylinders carried thereby, pistons in said cylinders, means for supplying said cylinders with a propulsive medium, exhaust ports and valves for said cylinders, and curved perforated tubes connected with said exhaust-ports, to carry off the spent propulsive medium, said tubes acting as a balance-wheel for the casing, as and for the purposes specified.

7. The combination of a crank-shaft, with a casing rotative thereon, cylinders and pistons, means for supplying the cylinders with a propulsive medium, exhaust ports and valves for said cylinders, a plurality of eccentrics connected together and respectively connected with said valves, and means for rotating said eccentrics by the rotation of said casing, substantially as described.

STEPHEN M. BALZER.

Witnesses:
E. D. TEPPER,
OTTO ZIMMERMAN.